United States Patent
Melli

(10) Patent No.: US 10,852,542 B2
(45) Date of Patent: Dec. 1, 2020

(54) WAVEGUIDES WITH LIGHT ABSORBING FILMS AND PROCESSES FOR FORMING THE SAME

(71) Applicant: Magic Leap, Inc., Plantation, FL (US)

(72) Inventor: Mauro Melli, San Leandro, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 15/912,877

(22) Filed: Mar. 6, 2018

(65) Prior Publication Data

US 2018/0267312 A1 Sep. 20, 2018

Related U.S. Application Data

(60) Provisional application No. 62/471,285, filed on Mar. 14, 2017.

(51) Int. Cl.
*G02B 27/01* (2006.01)
*F21V 8/00* (2006.01)

(52) U.S. Cl.
CPC ....... *G02B 27/0172* (2013.01); *G02B 6/0023* (2013.01); *G02B 6/0038* (2013.01); *G02B 6/0036* (2013.01); *G02B 6/0065* (2013.01); *G02B 6/0076* (2013.01); *G02B 2027/012* (2013.01); *G02B 2027/0134* (2013.01); *G02B 2027/0178* (2013.01)

(58) Field of Classification Search
CPC .................................................. G02B 6/0076
See application file for complete search history.

(56) References Cited

U.S. PATENT DOCUMENTS

| 6,850,221 B1 | 2/2005 | Tickle |
| 7,205,960 B2 * | 4/2007 | David ............... G02B 27/0103 345/204 |
| 8,743,464 B1 * | 6/2014 | Amirparviz ........... G02B 27/01 359/633 |
| 8,950,867 B2 | 2/2015 | Macnamara |
| 9,081,426 B2 | 7/2015 | Armstrong |
| 9,215,293 B2 | 12/2015 | Miller |
| 9,310,559 B2 | 4/2016 | Macnamara |

(Continued)

FOREIGN PATENT DOCUMENTS

| CN | 101192478 A | 6/2008 |
| JP | 2003177250 A * | 6/2003 |

(Continued)

OTHER PUBLICATIONS

International Search Report and Written Opinion for PCT Application No. PCT/US 18/21159, dated Jun. 1, 2018.

(Continued)

*Primary Examiner* — Omar R Rojas

(74) *Attorney, Agent, or Firm* — Knobbe, Martens, Olson & Bear, LLP

(57) ABSTRACT

In some embodiments, a display device includes one or more waveguides having a vapor deposited light absorbing film on edges of the waveguide to mitigate ghost images. In some embodiments, the film is formed directly on the edge of the waveguide by a vapor deposition, such as an evaporative deposition process. In some embodiments, the light absorbing films may comprise carbon, for example carbon in the form of one or more allotropes of carbon, such as fullerenes, or black silicon.

6 Claims, 13 Drawing Sheets

(56) References Cited

U.S. PATENT DOCUMENTS

| | | |
|---|---|---|
| 9,348,143 B2 | 5/2016 | Gao et al. |
| D758,367 S | 6/2016 | Natsume |
| 9,417,452 B2 | 8/2016 | Schowengerdt et al. |
| 9,470,906 B2 | 10/2016 | Kaji et al. |
| 9,547,174 B2 | 1/2017 | Gao et al. |
| 9,671,566 B2 | 6/2017 | Abovitz et al. |
| 9,740,006 B2 | 8/2017 | Gao |
| 9,791,700 B2 | 10/2017 | Schowengerdt et al. |
| 9,851,563 B2 | 12/2017 | Gao et al. |
| 9,857,591 B2 | 1/2018 | Welch et al. |
| 9,874,749 B2 | 1/2018 | Bradski et al. |
| 2006/0148272 A1 | 7/2006 | Barron et al. |
| 2007/0008456 A1 | 1/2007 | Lesage et al. |
| 2007/0098318 A1 | 3/2007 | An et al. |
| 2010/0277803 A1 | 11/2010 | Pockett et al. |
| 2012/0127062 A1 | 5/2012 | Bar-Zeev et al. |
| 2013/0082922 A1 | 4/2013 | Miller |
| 2013/0117377 A1 | 5/2013 | Miller |
| 2013/0125027 A1 | 5/2013 | Abovitz |
| 2013/0322810 A1 | 12/2013 | Robbins |
| 2014/0071539 A1 | 3/2014 | Gao |
| 2014/0177023 A1 | 6/2014 | Gao et al. |
| 2014/0218468 A1 | 8/2014 | Gao et al. |
| 2014/0267420 A1 | 9/2014 | Schowengerdt |
| 2014/0306866 A1 | 10/2014 | Miller et al. |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0222883 A1 | 8/2015 | Welch |
| 2015/0222884 A1 | 8/2015 | Cheng |
| 2015/0268415 A1 | 9/2015 | Schowengerdt et al. |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0346490 A1 | 12/2015 | Tekolste et al. |
| 2015/0346495 A1* | 12/2015 | Welch ................ G02B 27/0172 345/8 |
| 2016/0011419 A1 | 1/2016 | Gao |
| 2016/0026253 A1 | 1/2016 | Bradski et al. |
| 2016/0116739 A1 | 4/2016 | Tekolste et al. |
| 2017/0066932 A1* | 3/2017 | Magdassi ............. C03C 17/007 |
| 2017/0357101 A1* | 12/2017 | Tervo ................. G03B 21/2033 |
| 2018/0190631 A1* | 7/2018 | Kim ................... G02F 1/13452 |

FOREIGN PATENT DOCUMENTS

| | | |
|---|---|---|
| JP | 2015-087660 A | 5/2015 |
| WO | WO 2015/184412 | 12/2015 |
| WO | WO 2018/169731 | 9/2018 |

OTHER PUBLICATIONS

International Preliminary Report on Patentability for PCT Application No. PCT/US 18/21159, dated Sep. 17, 2019.

* cited by examiner

WAVEGUIDES WITH LIGHT ABSORBING FILMS AND PROCESSES FOR FORMING THE SAME

PRIORITY CLAIM

This application claims the benefit of priority under 35 U.S.C. § 119(e) of U.S. Provisional Application No. 62/471,285 filed on Mar. 14, 2017. The entire disclosure of this priority document is incorporated herein by reference.

INCORPORATION BY REFERENCE

This application incorporates by reference the entirety of each of the following patent applications: U.S. application Ser. No. 14/555,585 filed on Nov. 27, 2014; U.S. application Ser. No. 14/690,401 filed on Apr. 18, 2015; U.S. application Ser. No. 14/212,961 filed on Mar. 14, 2014; and U.S. application Ser. No. 14/331,218 filed on Jul. 14, 2014.

BACKGROUND

Field

The present disclosure relates to display systems and, more particularly, to light absorbers for optical elements.

Description of the Related Art

Modern computing and display technologies have facilitated the development of systems for so called "virtual reality" or "augmented reality" experiences, in which digitally reproduced images or portions thereof are presented to a user in a manner wherein they seem to be, or may be perceived as, real. A virtual reality, or "VR", scenario typically involves the presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, an MR scenario may include AR image content that appears to be blocked by or is otherwise perceived to interact with objects in the real world.

Referring to FIG. 1, an augmented reality scene 1 is depicted. The user of an AR technology sees a real-world park-like setting 1100 featuring people, trees, buildings in the background, and a concrete platform 1120. The user also perceives that he "sees" "virtual content" such as a robot statue 1110 standing upon the real-world platform 1120, and a flying cartoon-like avatar character 1130 which seems to be a personification of a bumble bee. These elements 1130, 1110 are "virtual" in that they do not exist in the real world. Because the human visual perception system is complex, it is challenging to produce AR technology that facilitates a comfortable, natural-feeling, rich presentation of virtual image elements amongst other virtual or real-world imagery elements.

Systems and methods disclosed herein address various challenges related to AR and VR technology.

SUMMARY

According to some aspects optical devices are provided herein. In some embodiments, an optical device may comprise an optical waveguide comprising a first surface, and a light absorber directly on at least the first surface, wherein the light absorber comprises a film comprising at least one of an allotrope of carbon and black silicon.

In some embodiments, the allotrope of carbon comprises one or more of carbon nanotubes, amorphous carbon, and fullerenes. In some embodiments the allotrope of carbon comprises fullerenes. In some embodiments, the fullerene is $C_{60}$. In some embodiments, the optical waveguide is part of a waveguide stack. In some embodiments, the optical waveguide further comprises incoupling optical elements and outcoupling optical elements on one or more major surfaces of the waveguide.

In some embodiments, the optical device is a head-mounted augmented reality display system, further comprising a spatial light modulator configured to output light having image content, and an image injection device configured to inject the light having image content into the waveguide through the incoupling optical element, wherein the outcoupling optical elements are configured to eject light propagating within the waveguide.

In some embodiments the film has a thickness of greater than about 100 nm. In some embodiments, the optical waveguide comprises a top major surface, a bottom major surface, and at least one edge surface, and wherein the first surface of the optical waveguide is the at least one edge surface. In some embodiments, the optical waveguide comprises a light absorber on a second surface of the waveguide facing the first surface. In some embodiments, the first and the second surfaces are edges of the waveguide.

According to some aspects display devices are provided. In some embodiments, a display device may comprise an optical waveguide comprising first and second major surfaces and edge surfaces extending therebetween, a spatial light modulator, an image injection device configured to inject light from the spatial light modulator into the waveguide, a light absorber on at least one edge surface, wherein the light absorber comprises a film comprising at least one of an allotrope of carbon and silicon, and wherein the light absorber absorbs at least 70% of incident light having a wavelength ranging from 350 to 850 nm.

In some embodiments, the film comprises at least one of carbon nanotubes, amorphous carbon, fullerenes or black silicon. In some embodiments, the light absorber absorbs at least 90% of incident light having a wavelength ranging from 350 to 850 nm.

According to some aspects processes for forming a light absorber on an optical waveguide are provided. In some embodiments, the process may comprise providing the optical waveguide in a reaction chamber, the waveguide comprising a first surface, forming a light absorbing film on the first surface, wherein forming the light absorbing film comprises contacting the first surface with airborne precursor species in the reaction chamber to deposit a thin film of the precursor species directly on the first surface, wherein the thin film comprises at least one of an allotrope of carbon and silicon, and wherein the deposited thin film absorbs at least 70% of incident light having a wavelength ranging from 350 to 850 nm.

In some embodiments, the deposited thin film comprises fullerenes. In some embodiments, the carbon thin film has a thickness of at least about 100 nm. In some embodiments, the deposited thin film comprises black silicon. In some embodiments, vapor depositing the thin film comprises evaporating a source material to form a vapor comprising a species of the source material, and contacting at least the first surface of the at least one optical element with the vapor. In some embodiments, the vapor comprises a powder. In some embodiments, the powder comprises fullerenes. In some embodiments, forming the light absorbing film further comprises etching the light absorbing film to form nanostructures in the film.

Various additional embodiments are provided below.

1. An optical device comprising:
an optical waveguide comprising a first surface; and
a light absorber directly on at least the first surface, wherein the light absorber comprises a film comprising at least one of an allotrope of carbon and black silicon.

2. The optical device of Embodiment 1, wherein the allotrope of carbon comprises one or more of carbon nanotubes, amorphous carbon, and fullerenes.

3. The optical device of Embodiment 2, wherein the allotrope of carbon comprises fullerenes.

4. The optical device of Embodiment 3, wherein the fullerene is $C_{60}$.

5. The optical device of Embodiment 1, wherein the optical waveguide is part of a waveguide stack.

6. The optical device of Embodiment 1, wherein the optical waveguide further comprises incoupling optical elements and outcoupling optical elements on one or more major surfaces of the waveguide.

7. The optical device of Embodiment 6, wherein the optical device is a head-mounted augmented reality display system, further comprising:
a spatial light modulator configured to output light having image content; and
an image injection device configured to inject the light having image content into the waveguide through the incoupling optical element,
wherein the outcoupling optical elements are configured to eject light propagating within the waveguide.

8. The optical device of Embodiment 1, wherein the film has a thickness of greater than about 100 nm.

9. The optical device of Embodiment 1, wherein the optical waveguide comprises a top major surface, a bottom major surface, and at least one edge surface, and wherein the first surface of the optical waveguide is the at least one edge surface.

10. The optical device of Embodiment 1, wherein the optical waveguide comprises a light absorber on a second surface of the waveguide facing the first surface.

11. The optical device of Embodiment 10, wherein the first and the second surfaces are edges of the waveguide.

12. A display device comprising:
an optical waveguide comprising first and second major surfaces and edge surfaces extending therebetween;
a spatial light modulator;
an image injection device configured to inject light from the spatial light modulator into the waveguide;
a light absorber on at least one edge surface,
wherein the light absorber comprises a film comprising at least one of an allotrope of carbon and silicon, and wherein the light absorber absorbs at least 70% of incident light having a wavelength ranging from 350 to 850 nm.

13. The optical device of Embodiment 12, wherein the film comprises at least one of carbon nanotubes, amorphous carbon, fullerenes or black silicon.

14. The optical device of Embodiment 12, wherein the light absorber absorbs at least 90% of incident light having a wavelength ranging from 350 to 850 nm.

15. A process for forming a light absorber on an optical waveguide, the process comprising:

providing the optical waveguide in a reaction chamber, the waveguide comprising a first surface;
forming a light absorbing film on the first surface, wherein forming the light absorbing film comprises:
contacting the first surface with airborne precursor species in the reaction chamber to deposit a thin film of the precursor species directly on the first surface,
wherein the thin film comprises at least one of an allotrope of carbon and silicon, and wherein the deposited thin film absorbs at least 70% of incident light having a wavelength ranging from 350 to 850 nm.

16. The process of Embodiment 15, wherein the deposited thin film comprises fullerenes.

17. The process of Embodiment 16, wherein the carbon thin film has a thickness of at least about 100 nm.

18. The process of Embodiment 15, wherein the deposited thin film comprises black silicon.

19. The process of Embodiment 15, wherein vapor depositing the thin film comprises:
evaporating a source material to form a vapor comprising a species of the source material; and
contacting at least the first surface of the at least one optical element with the vapor.

20. The process of Embodiment 19, wherein the vapor comprises a powder.

21. The process of Embodiment 20, wherein the powder comprises fullerenes.

22. The process of Embodiment 15, wherein forming the light absorbing film further comprises:
etching the light absorbing film to form nanostructures in the film.

Figure 1:
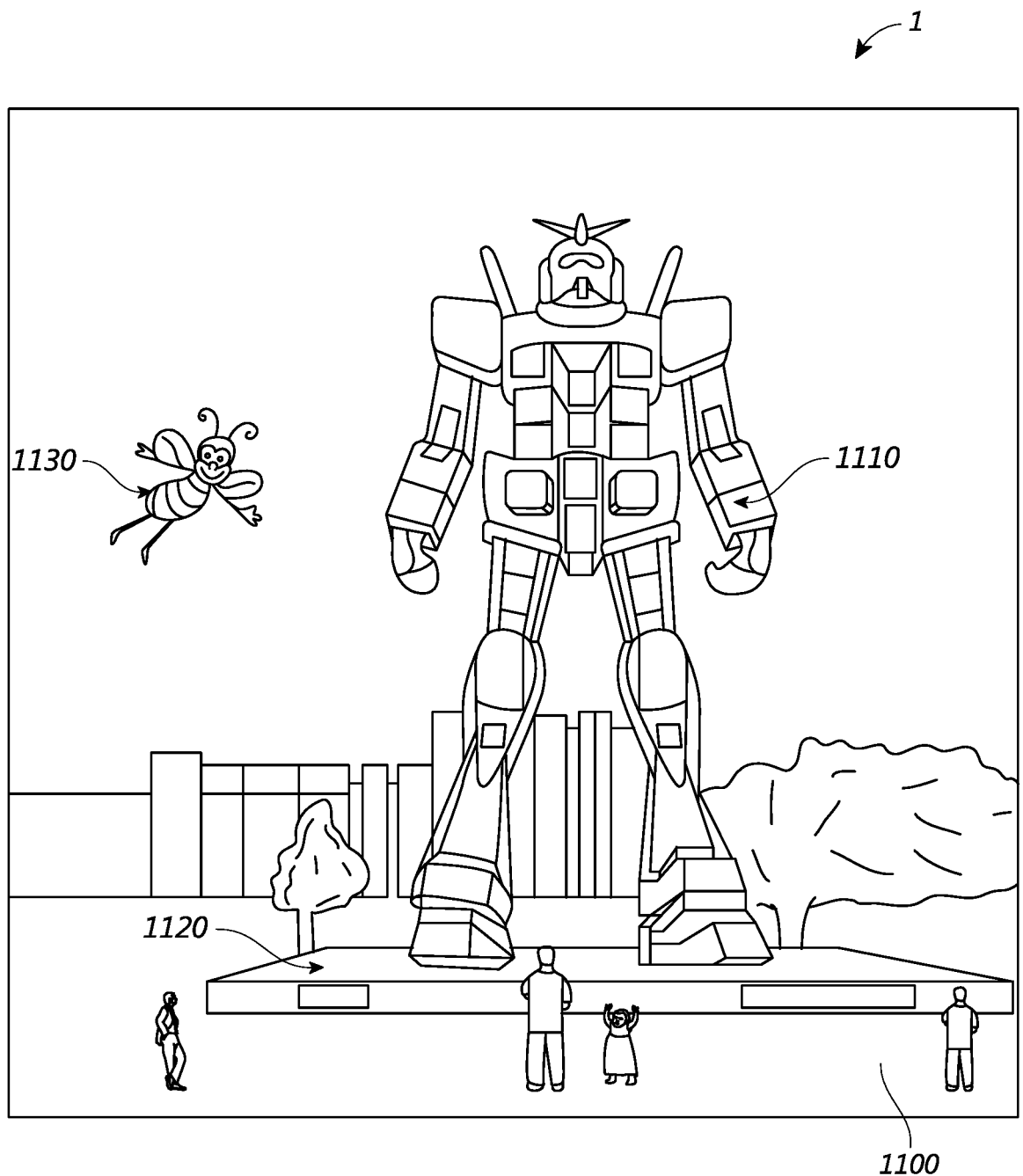
FIG. 1 illustrates a user's view of augmented reality (AR) through an AR device.

The drawings are provided to illustrate example embodiments and are not intended to limit the scope of the disclosure.

DETAILED DESCRIPTION

Optical waveguides may be used to propagate light, for example by total internal reflection (TIR) of the light within the body of the waveguide. In some applications, waveguides may be used to distribute light containing image information across a display and to output the light to a user, to form images seen by the user. For example, the waveguides may include outcoupling optical elements that redirect the light propagating inside the waveguide out towards the user. It will be appreciated that the image information in the outputted light may be video content in which features in the images, or frames of the video, change from image to image, to simulate motion. As a result, the output of the image information to the user is time sensitive in the sense that different frames are preferably received by the user at particular times, in a particular temporal sequence, else the perception of motion in the video may be adversely impacted.

Because the surfaces of waveguides may be reflective, light propagating within the waveguide may continue to reflect back and forth inside the waveguide until that light is outcoupled. This light reflecting back and forth inside the waveguide may be referred to as recirculated light. For example, recirculated light may reflect back and forth between edges of the waveguides. The recirculated light, however, may contain image information for previous video frames. As a result, a phenomenon referred to as ghosting may occur in which recirculated light causes content from previous frames to be presented to the user along with the correct, current frames. In addition, the recirculated light may decrease contrast ratios by, e.g., causing the output of light in parts of an image where less light output is intended.

Some proposed methods of reducing light recirculation include attaching light absorbing structures to surfaces, such as edges of the waveguide, from which reflection is not desired. For example, strips of light absorbing materials, light absorbing inks. and light absorbing paints have been proposed as light absorbers. Waveguides having these attached materials, however, have been found to still exhibit significant amounts of ghosting and have low contrast ratios.

In some embodiments, a waveguide may include one or more light absorbers deposited on one or more surfaces, such as edges, of the waveguide. In some embodiments, the light absorber may comprise one or more of carbon and silicon. For example, the light absorber may comprise a thin film comprising carbon, for example one or more forms or allotropes of carbon, such as carbon nanotubes, amorphous carbon, and/or fullerenes including buckminsterfullerene ($C_{60}$) and fullerenes other than $C_{60}$. In some embodiments, the thin film comprises mixed phases of carbon. In some embodiments, the light absorber may comprise a thin film comprising silicon, for example a silicon thin film having a surface comprising a plurality of nanostructures thereon, for example black silicon.

In some embodiments, the light absorber is in direct contact with a surface of the waveguide. In some embodiments, the light absorber absorbs at least 80% of incident light, at least 90% of incident light, at least 95% of incident light, or at least 96%, 97%, 98%, 99%, or higher of incident light.

Preferably, the light absorber is vapor deposited on the waveguide surface using airborne precursor species that contact and deposit on the surface. For example, the precursor species may be gas phase species, or a vapor of small (e.g., microscopic) particles. Examples of vapor deposition processes include physical vapor deposition (PVD) processes, chemical vapor deposition (CVD) processes, and atomic layer deposition (ALD) processes. In some embodiments, the PVD may be an evaporative deposition process, for example, a thermal evaporation deposition process.

Advantageously, in some embodiments where the waveguide is utilized in a display to propagate light containing image information, the light absorbers may serve to increase the quality of displayed images. For example, waveguides with light absorbers may provide a higher contrast ratio and a reduced incidence of ghosting. Without being limited by theory, it is believed that the light absorbers reduce the amount of recirculated light within the waveguide.

Reference will now be made to the drawings, in which like reference numerals refer to like features throughout.

Example Display Systems

Figure 2:
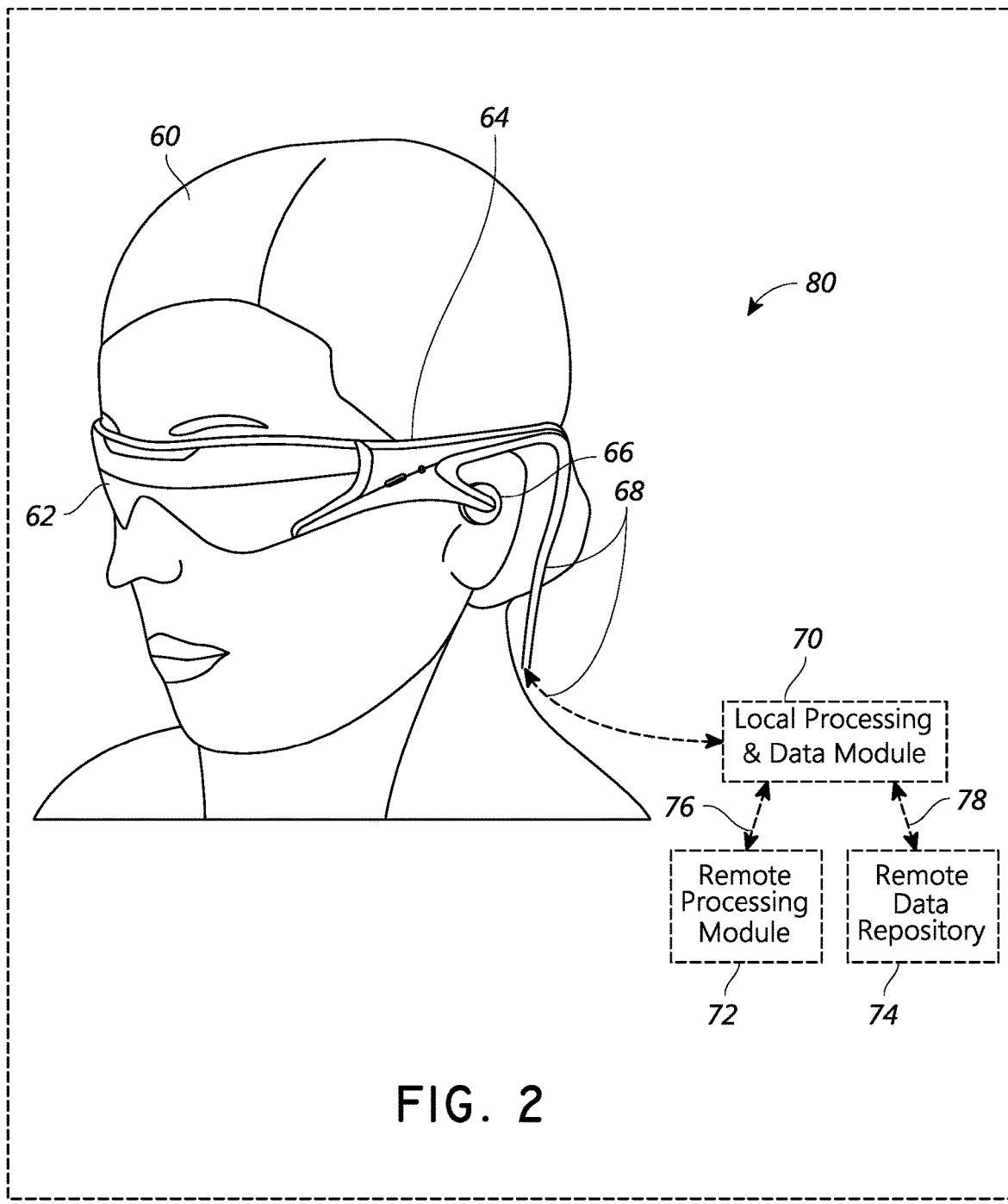
FIG. 2 illustrates an example of wearable display system.

FIG. 2 illustrates an example of wearable display system 80. The display system 80 includes a display 62, and various mechanical and electronic modules and systems to support the functioning of that display 62. The display 62 may be coupled to a frame 64, which is wearable by a display system user or viewer 60 and which is configured to position the display 62 in front of the eyes of the user 60. The display 62 may be considered eyewear in some embodiments. In some embodiments, a speaker 66 is coupled to the frame 64 and positioned adjacent the ear canal of the user 60 (another speaker, not shown, may optionally be positioned adjacent the other ear canal of the user to provide for stereo/shapeable sound control). The display system may also include one or more microphones 67 or other devices to detect sound. In some embodiments, the microphone is configured to allow the user to provide inputs or commands to the system 80 (e.g., the selection of voice menu commands, natural language questions, etc.) and/or may allow audio communication with other persons (e.g., with other users of similar display systems).

With continued reference to FIG. 2, the display 62 is operatively coupled by communications link 68, such as by a wired lead or wireless connectivity, to a local data processing module 70 which may be mounted in a variety of configurations, such as fixedly attached to the frame 64, fixedly attached to a helmet or hat worn by the user, embedded in headphones, or otherwise removably attached to the user 60 (e.g., in a backpack-style configuration, in a belt-coupling style configuration). The local processing and data module 70 may comprise a hardware processor, as well as digital memory, such as non-volatile memory (e.g., flash memory or hard disk drives), both of which may be utilized to assist in the processing, caching, and storage of data. The data include data a) captured from sensors (which may be, e.g., operatively coupled to the frame 64 or otherwise attached to the user 60), such as image capture devices (such as cameras), microphones, inertial measurement units, accelerometers, compasses, GPS units, radio devices, gyros, and/or other sensors disclosed herein; and/or b) acquired and/or processed using remote processing module 72 and/or remote data repository 74 (including data relating to virtual content), possibly for passage to the display 62 after such processing or retrieval. The local processing and data module 70 may be operatively coupled by communication links 76, 78, such as via a wired or wireless communication links, to the remote processing module 72 and remote data repository 74 such that these remote modules 72, 74 are operatively coupled to each other and available as resources to the local processing and data module 70. In some embodiments, the local processing and data module 70 may include one or more of the image capture devices, microphones, inertial measurement units, accelerometers, compasses, GPS units, radio devices, and/or gyros. In some other embodiments, one or more of these sensors may be attached to the frame 64, or may be standalone structures that communicate with the local processing and data module 70 by wired or wireless communication pathways.

With continued reference to FIG. 2, in some embodiments, the remote processing module 72 may comprise one or more processors configured to analyze and process data and/or image information. In some embodiments, the remote data repository 74 may comprise a digital data storage facility, which may be available through the internet or other networking configuration in a "cloud" resource configuration. In some embodiments, the remote data repository 74 may include one or more remote servers, which provide information, e.g., information for generating augmented reality content, to the local processing and data module 70 and/or the remote processing module 72. In some embodiments, all data is stored and all computations are performed in the local processing and data module, allowing fully autonomous use from a remote module.

Figure 3:
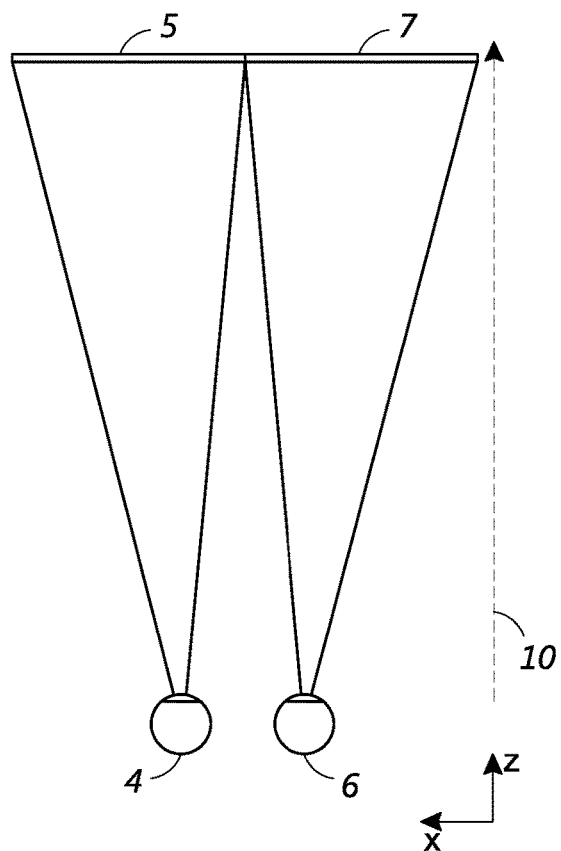
FIG. 3 illustrates a conventional display system for simulating three-dimensional imagery for a user.

With reference now to FIG. 3, the perception of an image as being "three-dimensional" or "3-D" may be achieved by providing slightly different presentations of the image to each eye of the viewer. FIG. 3 illustrates a conventional display system for simulating three-dimensional imagery for a user. Two distinct images 5, 7—one for each eye 4, 6—are outputted to the user. The images 5, 7 are spaced from the eyes 4, 6 by a distance 10 along an optical or z-axis parallel to the line of sight of the viewer. The images 5, 7 are flat and the eyes 4, 6 may focus on the images by assuming a single accommodated state. Such systems rely on the human visual system to combine the images 5, 7 to provide a perception of depth and/or scale for the combined image.

It will be appreciated, however, that the human visual system is more complicated and providing a realistic perception of depth is more challenging. For example, many viewers of conventional "3-D" display systems find such systems to be uncomfortable or may not perceive a sense of depth at all. Without being limited by theory, it is believed that viewers of an object may perceive the object as being "three-dimensional" due to a combination of vergence and accommodation. Vergence movements (i.e., rotation of the eyes so that the pupils move toward or away from each other to converge the lines of sight of the eyes to fixate upon an object) of the two eyes relative to each other are closely associated with focusing (or "accommodation") of the lenses and pupils of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, a change in vergence will trigger a matching change in accommodation of lens shape and pupil size, under normal conditions. As noted herein, many stereoscopic or "3-D" display systems display a scene using slightly different presentations (and, so, slightly different images) to each eye such that a three-dimensional perspective is perceived by the human visual system. Such systems are uncomfortable for many viewers, however, since they, among other things, simply provide a different presentations of a scene, but with the eyes viewing all the image information at a single accommodated state, and work against the "accommodation-vergence reflex." Display systems that provide a better match between accommodation and vergence may form more realistic and comfortable simulations of three-dimensional imagery.

Figure 4:
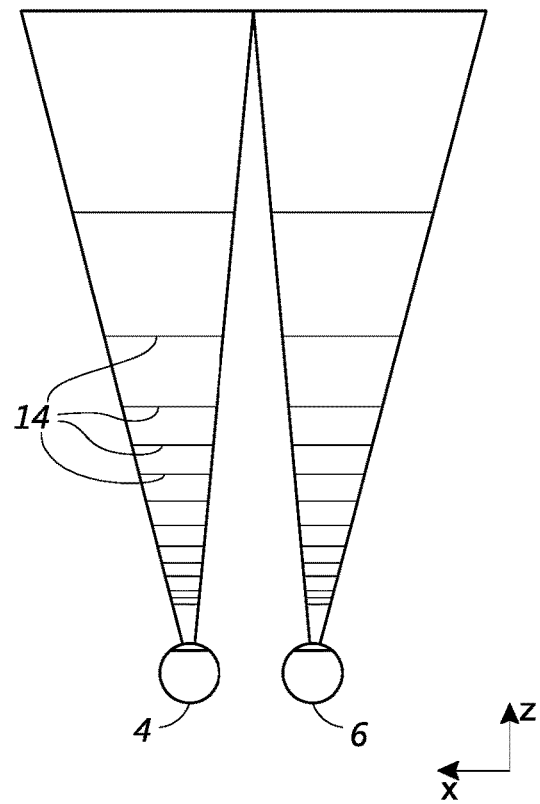
FIG. 4 illustrates aspects of an approach for simulating three-dimensional imagery using multiple depth planes.

FIG. 4 illustrates aspects of an approach for simulating three-dimensional imagery using multiple depth planes. With reference to FIG. 4, objects at various distances from eyes 4, 6 on the z-axis are accommodated by the eyes 4, 6 so that those objects are in focus. The eyes (4 and 6) assume particular accommodated states to bring into focus objects at different distances along the z-axis. Consequently, a particular accommodated state may be said to be associated with a particular one of depth planes 14, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 4, 6, and also by providing different presentations of the image corresponding to each of the depth planes. While shown as being separate for clarity of illustration, it will be appreciated that the fields of view of the eyes 4, 6 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state.

Figure 5A:
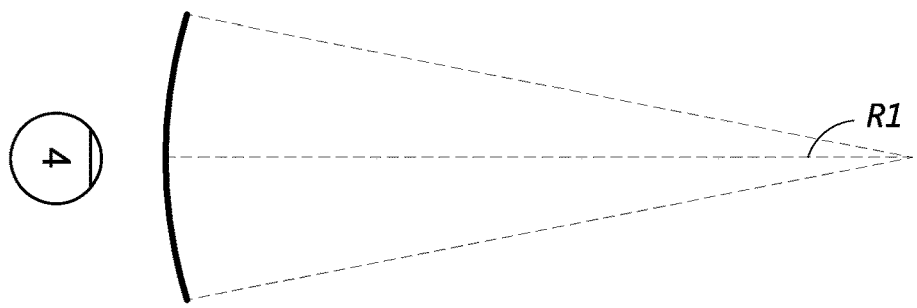
FIGS. 5A-5C illustrate relationships between radius of curvature and focal radius.
Figure 5B:
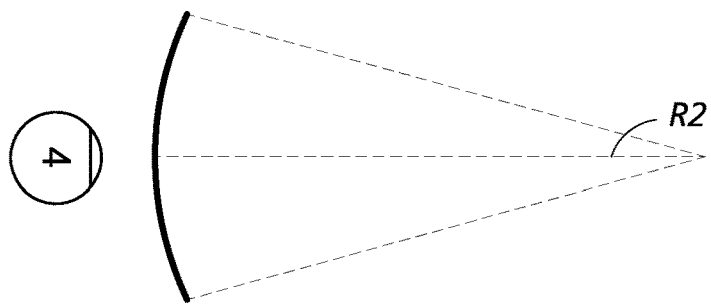
Figure 5C:
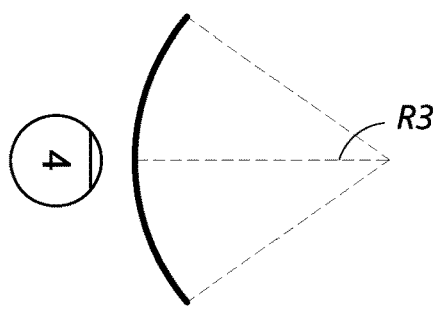

The distance between an object and the eye 4 or 6 may also change the amount of divergence of light from that object, as viewed by that eye. FIGS. 5A-5C illustrates relationships between distance and the divergence of light rays. The distance between the object and the eye 4 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 4. Consequently, at different depth planes, the degree of divergence of light rays is also different, with the degree of divergence increasing with decreasing distance between depth planes and the viewer's eye 4. While only a single eye 4 is illustrated for clarity of illustration in FIGS. 5A-5C and other figures herein, it will be appreciated that the discussions regarding eye 4 may be applied to both eyes 4 and 6 of a viewer.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. The different presentations may be separately focused by the viewer's eyes, thereby helping to provide the user with depth cues based on the accommodation of the eye required to bring into focus different image features for the scene located on different depth plane and/or based on observing different image features on different depth planes being out of focus.

Figure 6:
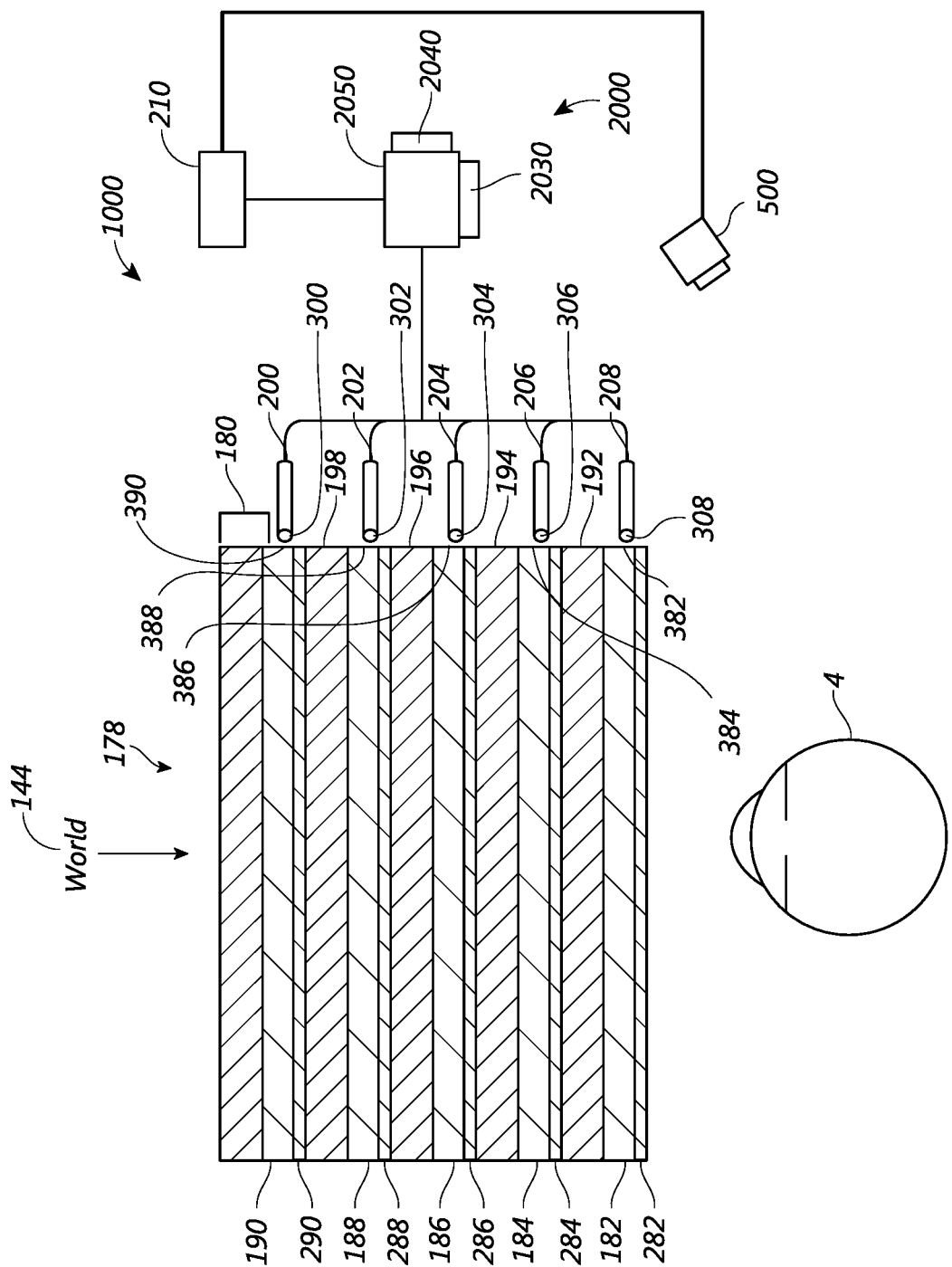
FIG. 6 illustrates an example of a waveguide stack for outputting image information to a user.

FIG. 6 illustrates an example of a waveguide stack for outputting image information to a user. A display system 1000 includes a stack of waveguides, or stacked waveguide assembly, 178 that may be utilized to provide three-dimensional perception to the eye/brain using a plurality of waveguides 182, 184, 186, 188, 190. In some embodiments, the display system 1000 is the system 80 of FIG. 2, with FIG. 6 schematically showing some parts of that system 80 in greater detail. For example, the waveguide assembly 178 may be part of the display 62 of FIG. 2. It will be appreciated that the display system 1000 may be considered a light field display in some embodiments.

With continued reference to FIG. 6, the waveguide assembly 178 may also include a plurality of features 198, 196, 194, 192 between the waveguides. In some embodiments, the features 198, 196, 194, 192 may be one or more lenses. The waveguides 182, 184, 186, 188, 190 and/or the plurality of lenses 198, 196, 194, 192 may be configured to send image information to the eye with various levels of wavefront curvature or light ray divergence. Each waveguide level may be associated with a particular depth plane and may be configured to output image information corresponding to that depth plane. Image injection devices 200, 202, 204, 206, 208 may function as a source of light for the waveguides and may be utilized to inject image information into the waveguides 182, 184, 186, 188, 190, each of which may be configured, as described herein, to distribute incoming light across each respective waveguide, for output toward the eye 4. Light exits an output surface 300, 302, 304, 306, 308 of the image injection devices 200, 202, 204, 206, 208 and is injected into a corresponding input surface 382, 384, 386, 388, 390 of the waveguides 182, 184, 186, 188, 190. In some embodiments, the each of the input surfaces 382, 384, 386, 388, 390 may be an edge of a corresponding waveguide, or may be part of a major surface of the corresponding waveguide (that is, one or both of the waveguide surfaces directly facing the world 144 or the viewer's eye 4). In some embodiments, a single beam of light (e.g. a collimated beam) may be injected into each waveguide to output an entire field of cloned collimated beams that are directed toward the eye 4 at particular angles (and amounts of divergence) corresponding to the depth plane associated with a particular waveguide. In some embodiments, a single one of the image injection devices 200, 202, 204, 206, 208 may be associated with and inject light into a plurality (e.g., three) of the waveguides 182, 184, 186, 188, 190.

In some embodiments, the image injection devices 200, 202, 204, 206, 208 are discrete displays that each produce image information for injection into a corresponding waveguide 182, 184, 186, 188, 190, respectively. In some other embodiments, the image injection devices 200, 202, 204, 206, 208 are the output ends of a single multiplexed display which may, e.g., pipe image information via one or more optical conduits (such as fiber optic cables) to each of the image injection devices 200, 202, 204, 206, 208. It will be appreciated that the image information provided by the image injection devices 200, 202, 204, 206, 208 may include light of different wavelengths, or colors (e.g., different component colors, as discussed herein).

In some embodiments, the light injected into the waveguides 182, 184, 186, 188, 190 is provided by a light projector system 2000, which comprises a light module 2040, which may include a light emitter, such as a light emitting diode (LED). The light from the light module 2040 may be directed to and modified by a light modulator 2030, e.g., a spatial light modulator, via a beam splitter 2050. The light modulator 2030 may be configured to change the perceived intensity of the light injected into the waveguides 182, 184, 186, 188, 190. Examples of spatial light modulators include liquid crystal displays (LCD) including a liquid crystal on silicon (LCOS) displays.

In some embodiments, the display system 1000 may be a scanning fiber display comprising one or more scanning fibers configured to project light in various patterns (e.g., raster scan, spiral scan, Lissajous patterns, etc.) into one or more waveguides 182, 184, 186, 188, 190 and ultimately to the eye 4 of the viewer. In some embodiments, the illustrated image injection devices 200, 202, 204, 206, 208 may schematically represent a single scanning fiber or a bundles of scanning fibers configured to inject light into one or a plurality of the waveguides 182, 184, 186, 188, 190. In some other embodiments, the illustrated image injection devices 200, 202, 204, 206, 208 may schematically represent a plurality of scanning fibers or a plurality of bundles of scanning, fibers each of which are configured to inject light into an associated one of the waveguides 182, 184, 186, 188, 190. It will be appreciated that the one or more optical fibers may be configured to transmit light from the light module 2040 to the one or more waveguides 182, 184, 186, 188, 190. It will be appreciated that one or more intervening optical structures may be provided between the scanning fiber, or fibers, and the one or more waveguides 182, 184, 186, 188, 190 to, e.g., redirect light exiting the scanning fiber into the one or more waveguides 182, 184, 186, 188, 190.

A controller 210 controls the operation of one or more of the stacked waveguide assembly 178, including operation of the image injection devices 200, 202, 204, 206, 208, the light source 2040, and the light modulator 2030. In some embodiments, the controller 210 is part of the local data processing module 70. The controller 210 includes programming (e.g., instructions in a non-transitory medium) that regulates the timing and provision of image information to the waveguides 182, 184, 186, 188, 190 according to, e.g., any of the various schemes disclosed herein. In some embodiments, the controller may be a single integral device, or a distributed system connected by wired or wireless communication channels. The controller 210 may be part of the processing modules 70 or 72 (FIG. 1) in some embodiments.

With continued reference to FIG. 6, the waveguides 182, 184, 186, 188, 190 may be configured to propagate light within each respective waveguide by total internal reflection (TIR). The waveguides 182, 184, 186, 188, 190 may each be planar or have another shape (e.g., curved), with major top and bottom surfaces and edges extending between those major top and bottom surfaces. In the illustrated configuration, the waveguides 182, 184, 186, 188, 190 may each include outcoupling optical elements 282, 284, 286, 288, 290 that are configured to extract light out of a waveguide by redirecting the light, propagating within each respective waveguide, out of the waveguide to output image information to the eye 4. Extracted light may also be referred to as outcoupled light and the outcoupling optical elements light may also be referred to light extracting optical elements. An extracted beam of light is outputted by the waveguide at locations at which the light propagating in the waveguide strikes a light extracting optical element. The outcoupling optical elements 282, 284, 286, 288, 290 may, for example, be gratings, including diffractive optical features, as discussed further herein. While illustrated disposed at the bottom major surfaces of the waveguides 182, 184, 186, 188, 190 for ease of description and drawing clarity, in some embodiments, the outcoupling optical elements 282, 284, 286, 288, 290 may be disposed at the top and/or bottom major surfaces, and/or may be disposed directly in the volume of the waveguides 182, 184, 186, 188, 190, as discussed further herein. In some embodiments, the outcoupling optical elements 282, 284, 286, 288, 290 may be formed in a layer of material that is attached to a transparent substrate to form the waveguides 182, 184, 186, 188, 190. In some other embodiments, the waveguides 182, 184, 186, 188, 190 may be a monolithic piece of material and the outcoupling optical elements 282, 284, 286, 288, 290 may be formed on a surface and/or in the interior of that piece of material.

With continued reference to FIG. 6, as discussed herein, each waveguide 182, 184, 186, 188, 190 is configured to output light to form an image corresponding to a particular depth plane. For example, the waveguide 182 nearest the eye may be configured to deliver collimated light, as injected into such waveguide 182, to the eye 4. The collimated light may be representative of the optical infinity focal plane. The next waveguide up 184 may be configured to send out collimated light which passes through the first lens 192 (e.g., a negative lens) before it can reach the eye 4; such first lens 192 may be configured to create a slight convex wavefront curvature so that the eye/brain interprets light coming from that next waveguide up 184 as coming from a first focal plane closer inward toward the eye 4 from optical infinity. Similarly, the third up waveguide 186 passes its output light through both the first 192 and second 194 lenses before reaching the eye 4; the combined optical power of the first 192 and second 194 lenses may be configured to create another incremental amount of wavefront curvature so that the eye/brain interprets light coming from the third waveguide 186 as coming from a second focal plane that is even closer inward toward the person from optical infinity than was light from the next waveguide up 184.

The other waveguide layers 188, 190 and lenses 196, 198 are similarly configured, with the highest waveguide 190 in the stack sending its output through all of the lenses between it and the eye for an aggregate focal power representative of the closest focal plane to the person. To compensate for the stack of lenses 198, 196, 194, 192 when viewing/interpreting light coming from the world 144 on the other side of the stacked waveguide assembly 178, a compensating lens layer 180 may be disposed at the top of the stack to compensate for the aggregate power of the lens stack 198, 196, 194, 192 below. Such a configuration provides as many perceived focal planes as there are available waveguide/lens pairings. Both the outcoupling optical elements of the waveguides and the focusing aspects of the lenses may be static (i.e., not dynamic or electro-active). In some alternative embodiments, either or both may be dynamic using electro-active features.

In some embodiments, two or more of the waveguides 182, 184, 186, 188, 190 may have the same associated depth plane. For example, multiple waveguides 182, 184, 186, 188, 190 may be configured to output images set to the same depth plane, or multiple subsets of the waveguides 182, 184, 186, 188, 190 may be configured to output images set to the same plurality of depth planes, with one set for each depth plane. This can provide advantages for forming a tiled image to provide an expanded field of view at those depth planes.

With continued reference to FIG. 6, the outcoupling optical elements 282, 284, 286, 288, 290 may be configured to both redirect light out of their respective waveguides and to output this light with the appropriate amount of divergence or collimation for a particular depth plane associated with the waveguide. As a result, waveguides having different associated depth planes may have different configurations of outcoupling optical elements 282, 284, 286, 288, 290, which output light with a different amount of divergence depending on the associated depth plane. In some embodiments, the light extracting optical elements 282, 284, 286, 288, 290 may be volumetric or surface features, which may be configured to output light at specific angles. For example, the light extracting optical elements 282, 284, 286, 288, 290 may be volume holograms, surface holograms, and/or diffraction gratings. In some embodiments, the features 198, 196, 194, 192 may not be lenses; rather, they may simply be spacers (e.g., cladding layers and/or structures for forming air gaps).

In some embodiments, the outcoupling optical elements 282, 284, 286, 288, 290 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 4 with each intersection of the DOE, while the rest continues to move through a waveguide via total internal reflection. The light carrying the image information is thus divided into a number of related exit beams that exit the waveguide at a multiplicity of locations and the result is a fairly uniform pattern of exit emission toward the eye 4 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 500 (e.g., a digital camera, including visible light and infrared light cameras) may be provided to capture images of the eye 4 and/or tissue around the eye 4 to, e.g., detect user inputs. As used herein, a camera may be any image capture device. In some embodiments, the camera assembly 500 may include an image capture device and a light source to project light (e.g., infrared light) to the eye, which may then be reflected by the eye and detected by the image capture device. In some embodiments, the camera assembly 500 may be attached to the frame 64 (FIG. 2) and may be in electrical communication with the processing modules 70 and/or 72, which may process image information from the camera assembly 500. In some embodiments, one camera assembly 500 may be utilized for each eye, to separately monitor each eye.

Figure 7:
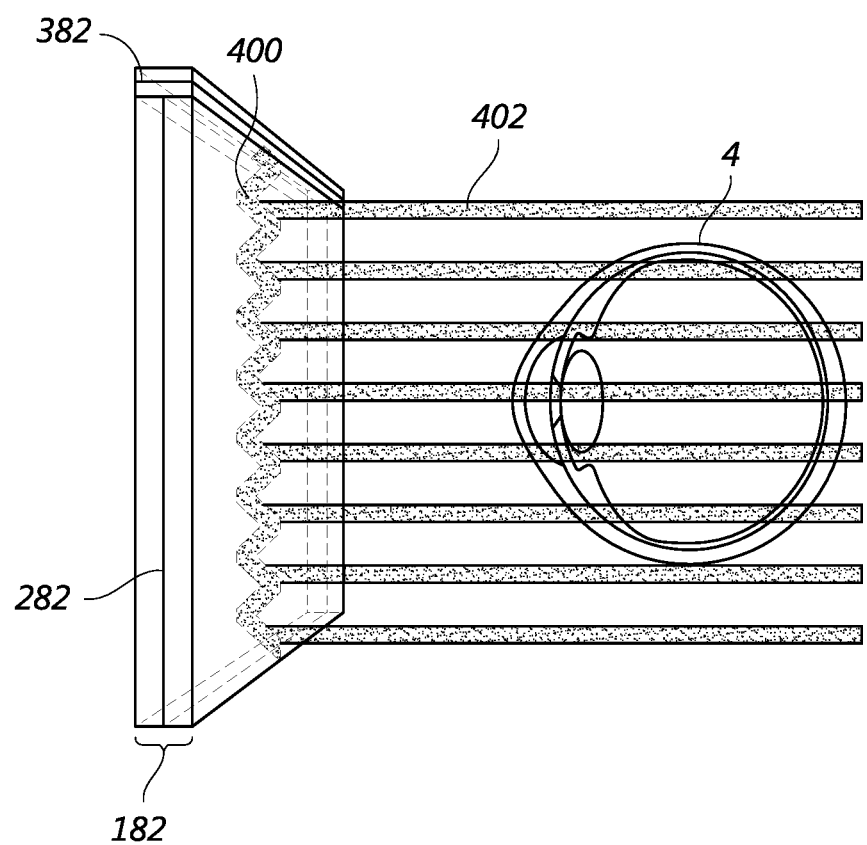
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 178 (FIG. 6) may function similarly, where the waveguide assembly 178 includes multiple waveguides. Light 400 is injected into the waveguide 182 at the input surface 382 of the waveguide 182 and propagates within the waveguide 182 by TIR. At points where the light 400 impinges on the DOE 282, a portion of the light exits the waveguide as exit beams 402. The exit beams 402 are illustrated as substantially parallel but, as discussed herein, they may also be redirected to propagate to the eye 4 at an angle (e.g., forming divergent exit beams), depending on the depth plane associated with the waveguide 182. It will be appreciated that substantially parallel exit beams may be indicative of a waveguide with outcoupling optical elements that outcouple light to form images that appear to be set on a depth plane at a large distance (e.g., optical infinity) from the eye 4. Other waveguides or other sets of outcoupling optical elements may output an exit beam pattern that is more divergent, which would require the eye 4 to accommodate to a closer distance to bring it into focus on the retina and would be interpreted by the brain as light from a distance closer to the eye 4 than optical infinity.

Figure 8:
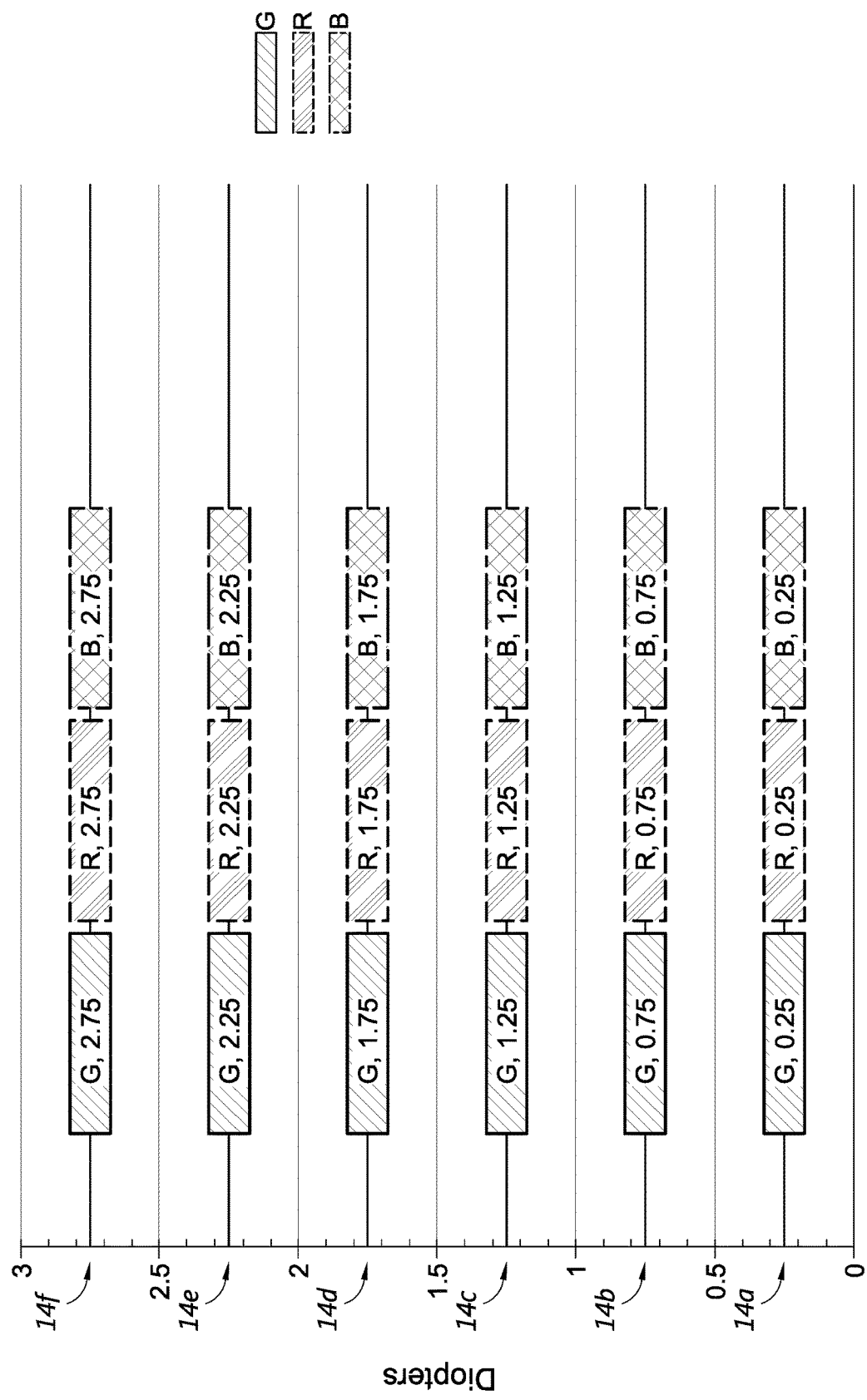
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 14*a*-14*f*, although more or fewer depths are also contemplated. Each depth plane may have three component color images associated with it: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

Figure 9A:
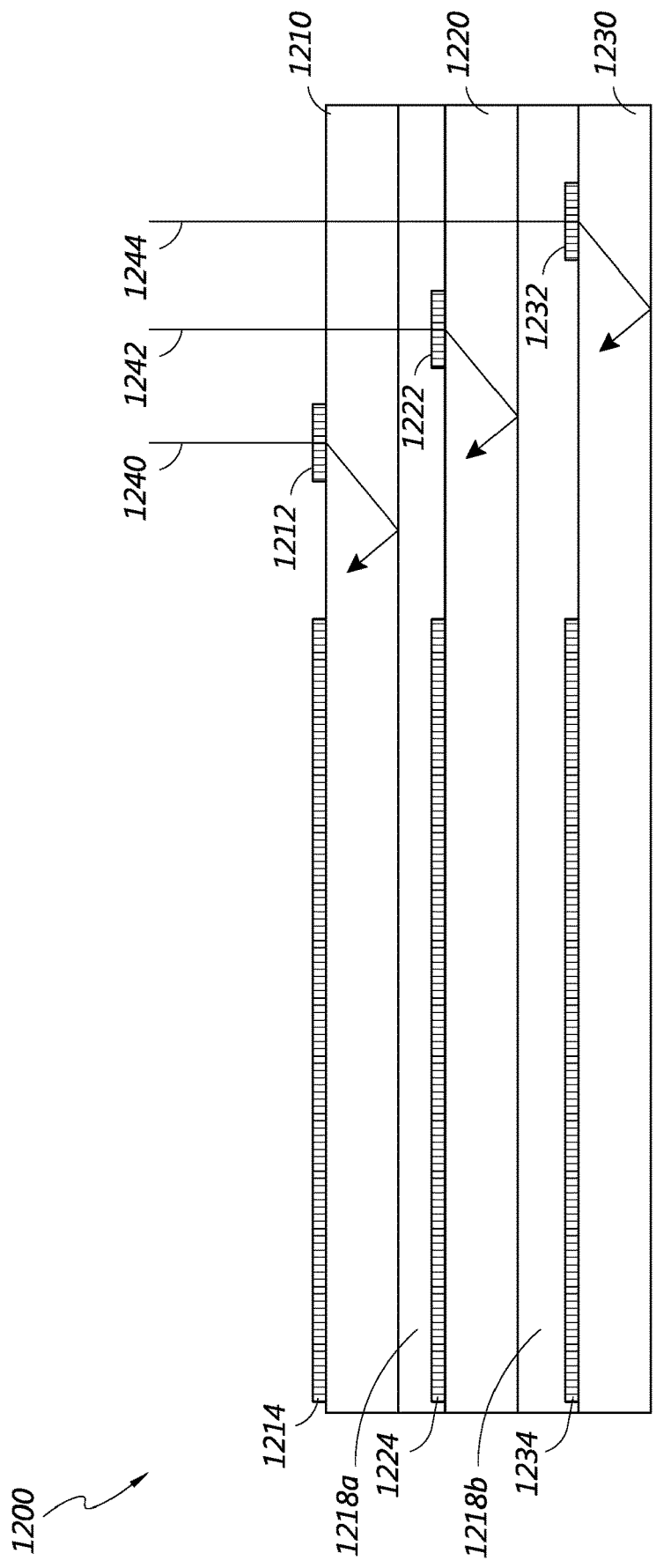
FIG. 9A illustrates a cross-sectional side view of an example of a set of stacked waveguides that each includes an incoupling optical element.

With reference now to FIG. 9A, in some embodiments, light impinging on a waveguide may need to be redirected to incouple that light into the waveguide. An incoupling optical element may be used to redirect and incouple the light into its corresponding waveguide. FIG. 9A illustrates a cross-sectional side view of an example of a plurality or set 1200 of stacked waveguides that each includes an incoupling optical element. The waveguides may each be configured to output light of one or more different wavelengths, or one or more different ranges of wavelengths. It will be appreciated that the stack 1200 may correspond to the stack 178 (FIG. 6) and the illustrated waveguides of the stack 1200 may correspond to part of the plurality of waveguides 182, 184, 186, 188, 190, except that light from one or more of the image injection devices 200, 202, 204, 206, 208 is injected into the waveguides from a position that requires light to be redirected for incoupling.

The illustrated set 1200 of stacked waveguides includes waveguides 1210, 1220, and 1230. Each waveguide includes an associated incoupling optical element (which may also be referred to as a light input area on the waveguide), with, e.g., incoupling optical element 1212 disposed on a major surface (e.g., an upper major surface) of waveguide 1210, incoupling optical element 1222 disposed on a major surface (e.g., an upper major surface) of waveguide 1220, and incoupling optical element 1232 disposed on a major surface (e.g., an upper major surface) of waveguide 1230. In some embodiments, one or more of the incoupling optical elements 1212, 1222, 1232 may be disposed on the bottom major surface of the respective waveguide 1210, 1220, 1230 (particularly where the one or more incoupling optical elements are reflective, deflecting optical elements). As illustrated, the incoupling optical elements 1212, 1222, 1232 may be disposed on the upper major surface of their respective waveguide 1210, 1220, 1230 (or the top of the next lower waveguide), particularly where those incoupling optical elements are transmissive, deflecting optical elements. In some embodiments, the incoupling optical elements 1212, 1222, 1232 may be disposed in the body of the respective waveguide 1210, 1220, 1230. In some embodiments, as discussed herein, the incoupling optical elements 1212, 1222, 1232 are wavelength selective, such that they selectively redirect one or more wavelengths of light, while transmitting other wavelengths of light. While illustrated on one side or corner of their respective waveguide 1210, 1220, 1230, it will be appreciated that the incoupling optical elements 1212, 1222, 1232 may be disposed in other areas of their respective waveguide 1210, 1220, 1230 in some embodiments.

As illustrated, the incoupling optical elements 1212, 1222, 1232 may be laterally offset from one another. In some embodiments, each incoupling optical element may be offset such that it receives light without that light passing through another incoupling optical element. For example, each incoupling optical element 1212, 1222, 1232 may be configured to receive light from a different image injection device and may be separated (e.g., laterally spaced apart) from other incoupling optical elements 1212, 1222, 1232 such that it substantially does not receive light from the other ones of the incoupling optical elements 1212, 1222, 1232.

Each waveguide also includes associated light distributing elements, with, e.g., light distributing elements 1214 disposed on a major surface (e.g., a top major surface) of waveguide 1210, light distributing elements 1224 disposed on a major surface (e.g., a top major surface) of waveguide 1220, and light distributing elements 1234 disposed on a major surface (e.g., a top major surface) of waveguide 1230. In some other embodiments, the light distributing elements 1214, 1224, 1234, may be disposed on a bottom major surface of associated waveguides 1210, 1220, 1230, respectively. In some other embodiments, the light distributing elements 1214, 1224, 1234, may be disposed on both top and bottom major surface of associated waveguides 1210, 1220, 1230, respectively; or the light distributing elements 1214, 1224, 1234, may be disposed on different ones of the top and bottom major surfaces in different associated waveguides 1210, 1220, 1230, respectively.

The waveguides 1210, 1220, 1230 may be spaced apart and separated by, e.g., gas, liquid, and/or solid layers of material. For example, as illustrated, layer 1218*a* may separate waveguides 1210 and 1220; and layer 1218*b* may separate waveguides 1220 and 1230. In some embodiments, the layers 1218*a* and 1218*b* are formed of low refractive index materials (that is, materials having a lower refractive index than the material forming the immediately adjacent one of waveguides 1210, 1220, 1230). Preferably, the refractive index of the material forming the layers 1218*a*, 1218*b* is 0.05 or more, or 0.10 or more less than the refractive index of the material forming the waveguides 1210, 1220, 1230. Advantageously, the lower refractive index layers 1218*a*, 1218*b* may function as cladding layers that facilitate total internal reflection (TIR) of light through the waveguides 1210, 1220, 1230 (e.g., TIR between the top and bottom major surfaces of each waveguide). In some embodiments, the layers 1218*a*, 1218*b* are formed of air. While not illustrated, it will be appreciated that the top and bottom of the illustrated set 1200 of waveguides may include immediately neighboring cladding layers.

Preferably, for ease of manufacturing and other considerations, the material forming the waveguides 1210, 1220, 1230 are similar or the same, and the material forming the layers 1218*a*, 1218*b* are similar or the same. In some embodiments, the material forming the waveguides 1210, 1220, 1230 may be different between one or more waveguides, and/or the material forming the layers 1218*a*, 1218*b* may be different, while still holding to the various refractive index relationships noted above.

With continued reference to FIG. 9A, light rays 1240, 1242, 1244 are incident on the set 1200 of waveguides. It will be appreciated that the light rays 1240, 1242, 1244 may be injected into the waveguides 1210, 1220, 1230 by one or more image injection devices 200, 202, 204, 206, 208 (FIG. 6).

In some embodiments, the light rays 1240, 1242, 1244 have different properties, e.g., different wavelengths or different ranges of wavelengths, which may correspond to different colors. The incoupling optical elements 1212, 1222, 1232 each deflect the incident light such that the light propagates through a respective one of the waveguides 1210, 1220, 1230 by TIR. In some embodiments, the incoupling optical elements 1212, 1222, 1232 each selectively deflect one or more particular wavelengths of light, while transmitting other wavelengths to an underlying waveguide and associated incoupling optical element.

For example, incoupling optical element 1212 may be configured to deflect ray 1240, which has a first wavelength or range of wavelengths, while transmitting rays 1242 and 1244, which have different second and third wavelengths or ranges of wavelengths, respectively. The transmitted ray 1242 then impinges on and is deflected by the incoupling optical element 1222, which is configured to selectively deflect light of second wavelength or range of wavelengths. The ray 1244 is transmitted by the incoupling optical element 1222 and continues on to impinge on and be deflected by the incoupling optical element 1232, which is configured to selectively deflect light of third wavelength or range of wavelengths.

With continued reference to FIG. 9A, the deflected light rays 1240, 1242, 1244 are deflected so that they propagate through a corresponding waveguide 1210, 1220, 1230; that is, the incoupling optical elements 1212, 1222, 1232 of each waveguide deflects light into that corresponding waveguide 1210, 1220, 1230 to incouple light into that corresponding waveguide. The light rays 1240, 1242, 1244 are deflected at angles that cause the light to propagate through the respective waveguide 1210, 1220, 1230 by TIR. The light rays 1240, 1242, 1244 propagate through the respective waveguide 1210, 1220, 1230 by TIR until impinging on the waveguide's corresponding light distributing elements 1214, 1224, 1234.

Figure 9B:
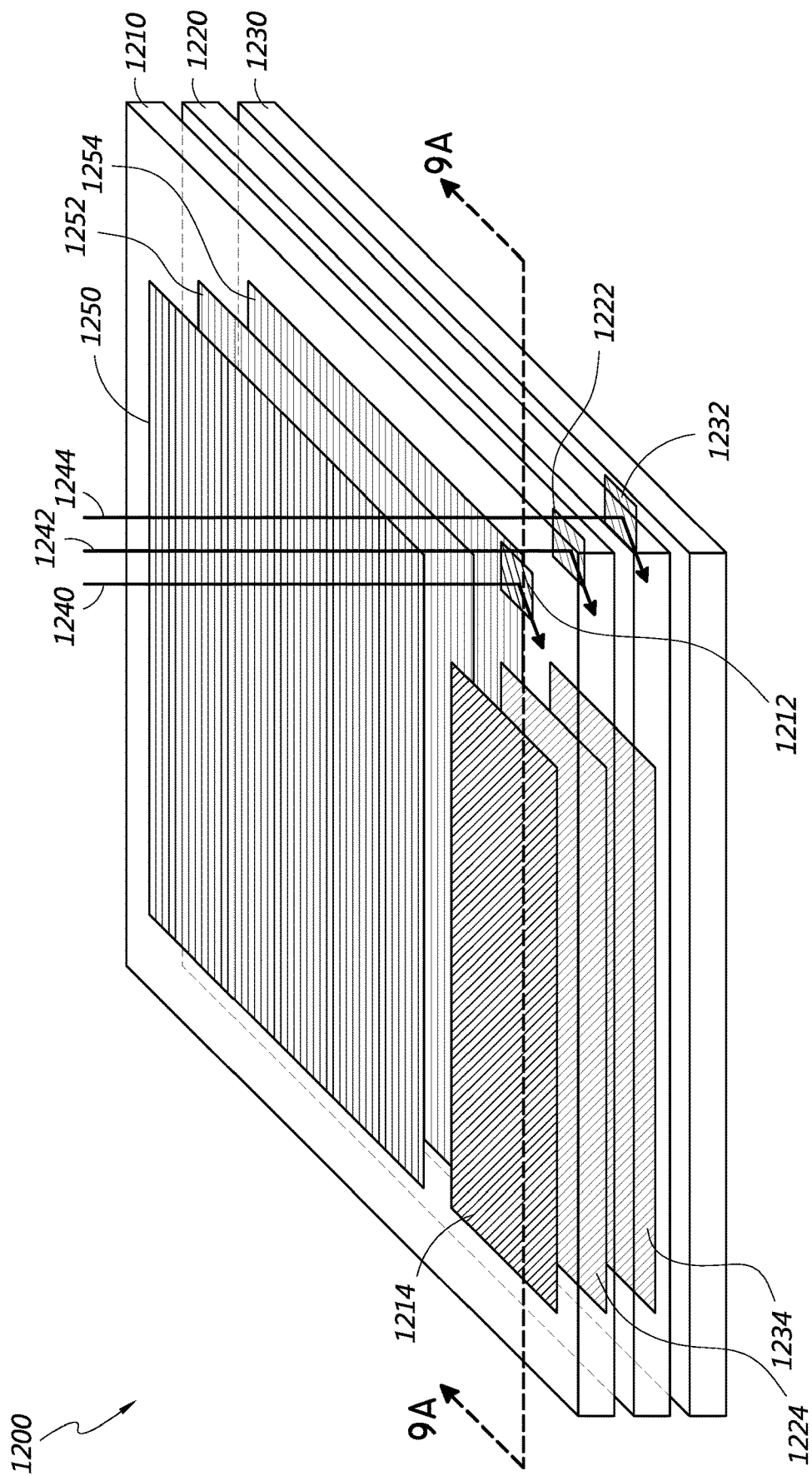
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the incoupled light rays 1240, 1242, 1244, are deflected by the incoupling optical elements 1212, 1222, 1232, respectively, and then propagate by TIR within the waveguides 1210, 1220, 1230, respectively. The light rays 1240, 1242, 1244 then impinge on the light distributing elements 1214, 1224, 1234, respectively. The light distributing elements 1214, 1224, 1234 deflect the light rays 1240, 1242, 1244 so that they propagate towards the outcoupling optical elements 1250, 1252, 1254, respectively.

In some embodiments, the light distributing elements 1214, 1224, 1234 are orthogonal pupil expanders (OPE's). In some embodiments, the OPE's both deflect or distribute light to the outcoupling optical elements 1250, 1252, 1254 and also increase the beam or spot size of this light as it propagates to the outcoupling optical elements. In some embodiments, e.g., where the beam size is already of a desired size, the light distributing elements 1214, 1224, 1234 may be omitted and the incoupling optical elements 1212, 1222, 1232 may be configured to deflect light directly to the outcoupling optical elements 1250, 1252, 1254. For example, with reference to FIG. 9A, the light distributing elements 1214, 1224, 1234 may be replaced with outcoupling optical elements 1250, 1252, 1254, respectively. In some embodiments, the outcoupling optical elements 1250, 1252, 1254 are exit pupils (EP's) or exit pupil expanders (EPE's) that direct light in a viewer's eye 4 (FIG. 7).

Accordingly, with reference to FIGS. 9A and 9B, in some embodiments, the set 1200 of waveguides includes waveguides 1210, 1220, 1230; incoupling optical elements 1212, 1222, 1232; light distributing elements (e.g., OPE's) 1214, 1224, 1234; and outcoupling optical elements (e.g., EP's) 1250, 1252, 1254 for each component color. The waveguides 1210, 1220, 1230 may be stacked with an air gap/cladding layer between each one. The incoupling optical elements 1212, 1222, 1232 redirect or deflect incident light (with different incoupling optical elements receiving light of different wavelengths) into its waveguide. The light then propagates at an angle which will result in TIR within the respective waveguide 1210, 1220, 1230. In the example shown, light ray 1240 (e.g., blue light) is deflected by the first incoupling optical element 1212, and then continues to bounce down the waveguide, interacting with the light distributing element (e.g., OPE's) 1214 and then the outcoupling optical element (e.g., EPs) 1250, in a manner described earlier. The light rays 1242 and 1244 (e.g., green and red light, respectively) will pass through the waveguide 1210, with light ray 1242 impinging on and being deflected by incoupling optical element 1222. The light ray 1242 then bounces down the waveguide 1220 via TIR, proceeding on to its light distributing element (e.g., OPEs) 1224 and then the outcoupling optical element (e.g., EP's) 1252. Finally, light ray 1244 (e.g., red light) passes through the waveguide 1220 to impinge on the light incoupling optical elements 1232 of the waveguide 1230. The light incoupling optical elements 1232 deflect the light ray 1244 such that the light ray propagates to light distributing element (e.g., OPEs) 1234 by TIR, and then to the outcoupling optical element (e.g., EPs) 1254 by TIR. The outcoupling optical element 1254 then finally outcouples the light ray 1244 to the viewer, who also receives the outcoupled light from the other waveguides 1210, 1220.

Figure 9C:
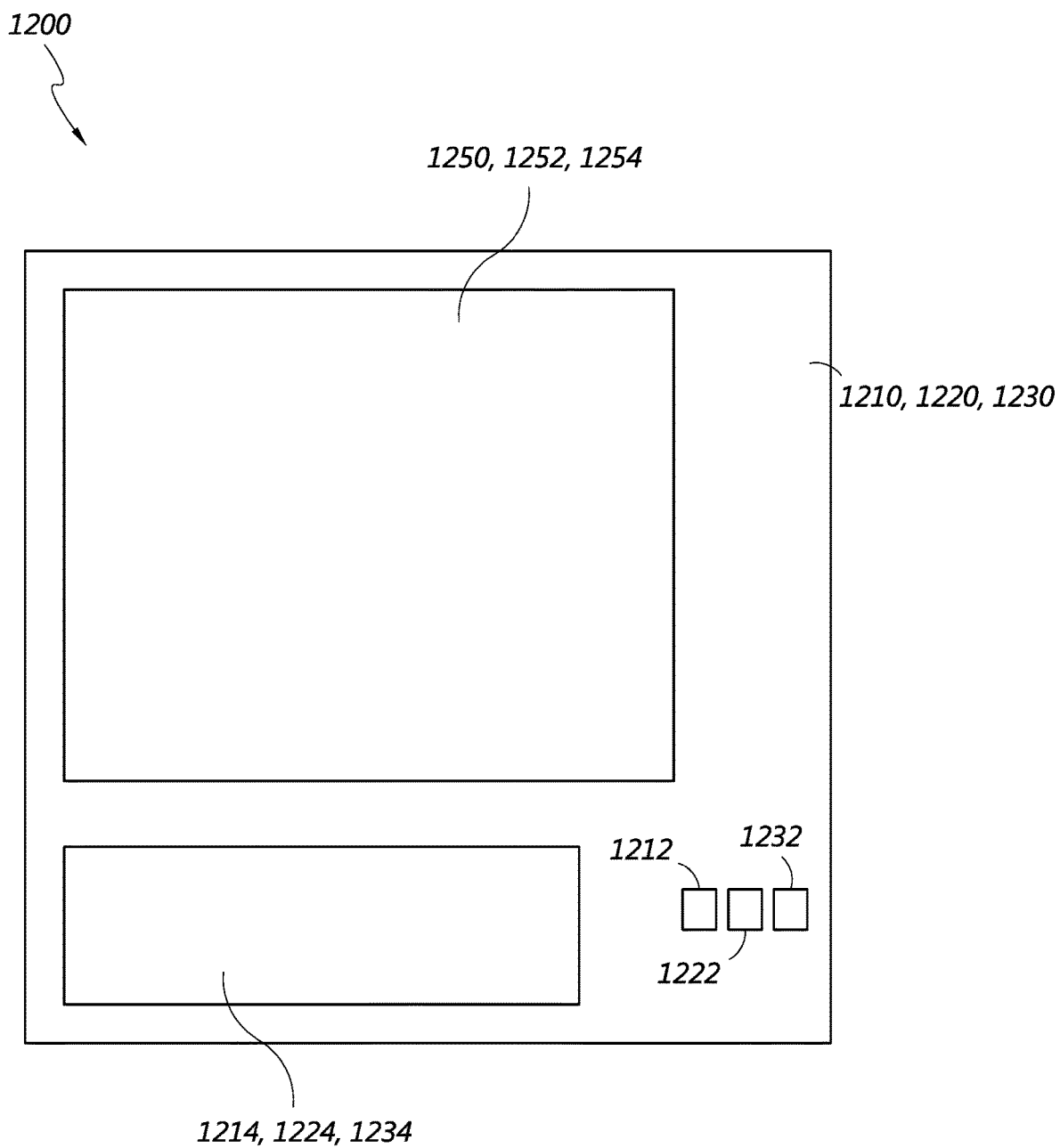
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 1210, 1220, 1230, along with each waveguide's associated light distributing element 1214, 1224, 1234 and associated outcoupling optical element 1250, 1252, 1254, may be vertically aligned. However, as discussed herein, the incoupling optical elements 1212, 1222, 1232 are not vertically aligned; rather, the incoupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated incoupling optical elements may be referred to as a shifted pupil system, and the in coupling optical elements within these arrangements may correspond to sub pupils.

Example Light Absorbers

Figure 10A:
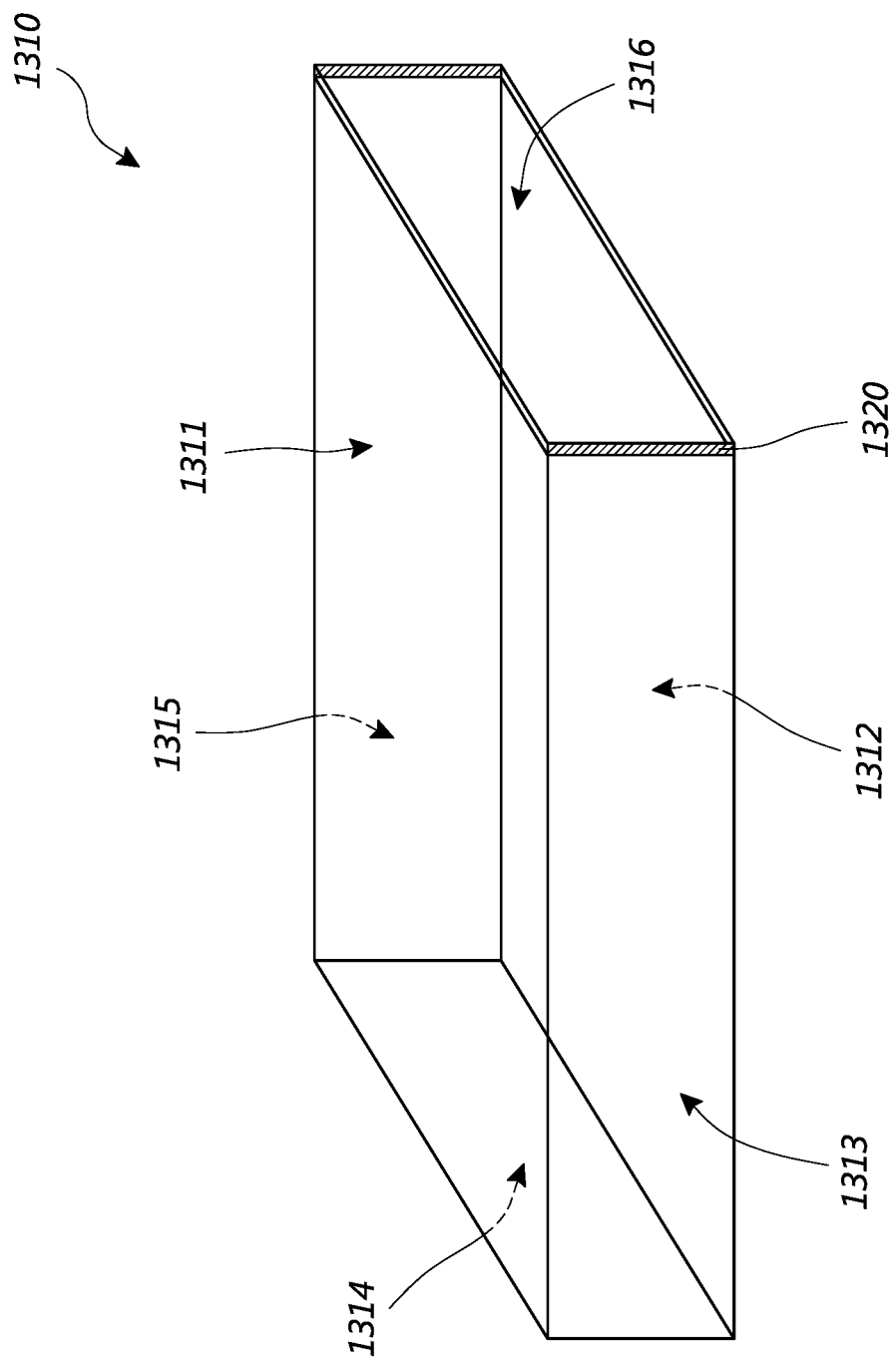
FIG. 10A illustrates an example of a waveguide including an optical element and a light absorber according to some embodiments.

Reference will now be made to FIG. 10A, which shows an example of a waveguide 1310 including a light absorber 1320, according to some embodiments. In some embodiments, the waveguide 1310 may be one of waveguides 182, 184, 186, 188, 190 (FIG. 6) or 1210, 1220, 1230 (FIGS. 9A-9B) as described herein. In some embodiments, the waveguide 1310 may be one of a plurality of similar waveguides forming a stack of waveguides, such as the stacked waveguide assembly 178 (FIG. 6) or waveguide stack 1200 (FIGS. 9A-9B).

The waveguide 1310 may comprise a top major surface 1311, a bottom major surface 1312, and four edge surfaces, 1313, 1314, 1315, 1316. It will be appreciated that the major surfaces have larger areas than the edge surfaces which extend between the major surfaces. As illustrated, the waveguide 1310 may take the form of a rectangular plate. In some other embodiments, the waveguide 1310 have other shapes, as seen in cross-sectional and/or top-down views. For example, the waveguide 1310 may have more than four edges or less than four edges.

Figure 10B:
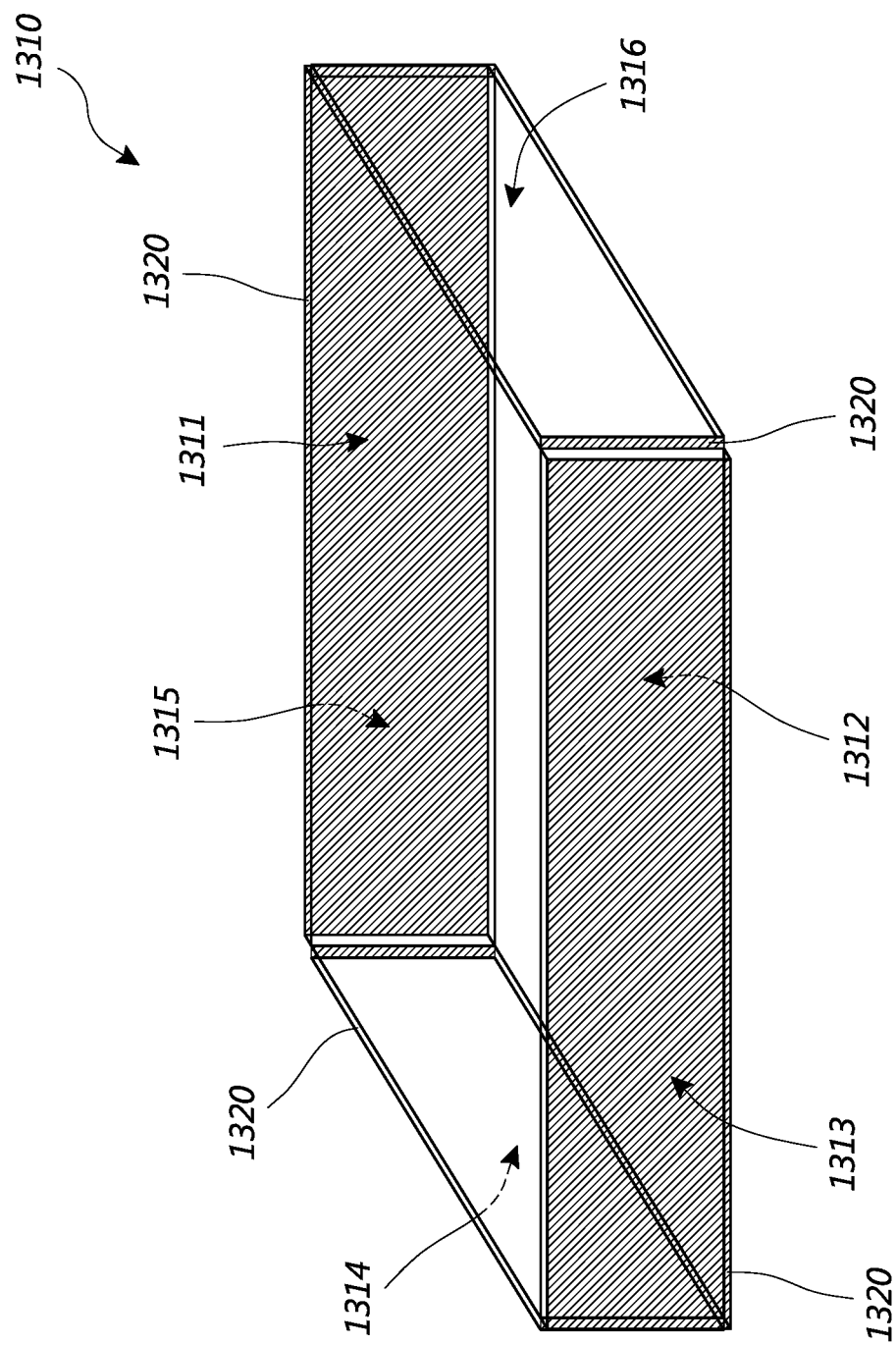
FIG. 10B illustrates an example of a waveguide including an optical element and light absorbers on a plurality of edge surfaces according to some embodiments.

In some embodiments, the light absorber 1320 is positioned or disposed directly on (that is, in contact with) a surface of the waveguide 1310 and may be sized such that the light absorber 1320 covers all, or substantially all, of the surface of the waveguide 1310 on which it is disposed. In some embodiments, the light absorber 1320 may be directly disposed on a first portion of a surface of the waveguide 1310, for example an edge surface 1313, 1314, 1315, 1316, and one or more additional light absorbers may be directly disposed on one or more additional portions of the same surface or other surfaces of the waveguide 1310. For example, light absorbers may be disposed on at least a pair of opposing ones of the edge surfaces 1313, 1314, 1315, 1316. In some embodiments, all edge surfaces 1313, 1314, 1315, 1316 are provided with corresponding light absorbers, as shown in FIG. 10B. In some embodiments, where the waveguide 1310 is one waveguide of a stack of waveguides (e.g., the waveguide stack 178 (FIG. 6) or 1200 (FIGS. 9A-9B)), each waveguide of the waveguide stack may have one or more separate light absorbers disposed on one or more corresponding edge surfaces thereof.

In some embodiments, the light absorber 1320 may comprise a thin film in direct contact with a surface of the waveguide 1310. The thin film may be deposited directly on a surface of the waveguide 1310. Preferably, the thin film is capable of or configured to absorb an exceptionally high percentage of light in a desired wavelength or spectrum of wavelengths, for example the visible spectrum. In some embodiments, the wavelength or spectrum of wavelengths is from about 250 nm to about 900 nm, from about 300 nm to about 850 nm, or from about 390 nm to about 700 nm. The light absorber may absorb at least about 50% of incident light, at least about 80% of incident light, at least about 90%, at least about 95%, at least about 96%, at least about 97%, at least about 98%, at least about 99% or more of incident light of the above-noted wavelengths or ranges of wavelengths.

In some embodiments, the thin film of the light absorber 1310 may comprise carbon. For example, the light absorber may comprise fullerenes, such as buckminsterfullerene ($C_{60}$). In some embodiments, the light absorber may comprise one or more forms or allotropes of carbon, such as carbon nanotubes, amorphous carbon, mixed phases of carbon, and/or fullerenes including $C_{60}$ and fullerenes other than $C_{60}$. In some embodiments, the light absorber may comprise silicon.

In some embodiments, the thin film may comprise micro or nanostructures configured to absorb light. For example, the thin film may have a nanostructured surface configured to absorb light having a desired wavelength or spectrum of wavelengths, for example wavelengths in the visible spectrum. The nanostructures may be a plurality of nanostructures elongated in a direction extending away from the surface of the waveguide on which the film is disposed. In some embodiments, the light absorber may comprise a plurality of substantially parallel nanotubes, such as a vertically aligned nanotube array (VANTA), with the vertical direction understood to be the direction extending normal to the surface on which the thin film is disposed. In some embodiments, the film may comprise black silicon, which comprises a plurality of nano scale cones or needles formed of silicon.

In some embodiments, the light absorber may be formed by depositing or forming a thin film on a surface of the waveguide 1310 using a vapor deposition process in a reaction chamber accommodating the waveguide 1310. For example, the vapor deposition process may be an atomic layer deposition (ALD) process, a plasma enhanced ALD (PEALD) process, a chemical vapor deposition (CVD) process, a plasma enhanced CVD (PECVD) process, a physical vapor deposition (PVD) process, or other vapor deposition process. In some embodiments, a process for forming or depositing the light absorber may comprise an evaporation process, for example a thermal evaporation process, an electron-beam process, a molecular beam epitaxy (MBE) process, a resistive evaporation process, a flash evaporation process, or other evaporation process.

In some embodiments, the vapor deposition process may be an evaporation process, in which energy is applied to a source material to vaporize the material to cause it to be airborne. For example, the evaporation process may be a thermal evaporation process and the energy may be heat energy. The source material may be heated to a sufficient temperature such that all or a portion of the source material is vaporized, thereby causing precursor species to be airborne. In some embodiments, the vapor formed during the evaporation process may comprise a vaporized powder comprising particles of the source material.

It will be appreciated that depositing the thin film may comprise exposing a desired surface of the waveguide to the precursor species, such as vaporized precursor species formed from the source material, for a duration sufficient to deposit sufficient material to form a thin film of a desired thickness. In some embodiments, the thin film may be deposited in a sequential deposition process in which a film of a desired thickness is built-up sublayer-by-sublayer, by the sequential deposition of sublayers. For example, the thin film may be formed by exposing the desired surface of the waveguide with the precursor species in pulses. That is, in some embodiments a desired surface of a waveguide may be contacted with vapor formed from the source material for a first desired duration, the vapor formed from the source material may then be removed from the desired surface of the waveguide, for example by purging a reaction chamber with an inert gas and/or by evacuating the reaction chamber, and subsequently contacting the desired surface of the waveguide with vapor formed from the source material for a second desired duration. These contacting and removing steps may be repeated any number of times until a thin film of a desired thickness has been formed on the desired surface of the waveguide.

In some embodiments, a thin film is selectively deposited on a desired surface by blocking deposition on other surfaces. For example, the other surfaces may be provided with a removable protective layer of material, which is removed after depositing the thin film. In some other embodiments, the thin film is deposited over multiple surfaces of the waveguide and is subsequently removed from surfaces for which the thin film is not desired. The removal may involve, e.g., etching and/or dissolving film from those surfaces where the film is not desired.

Figure 11:
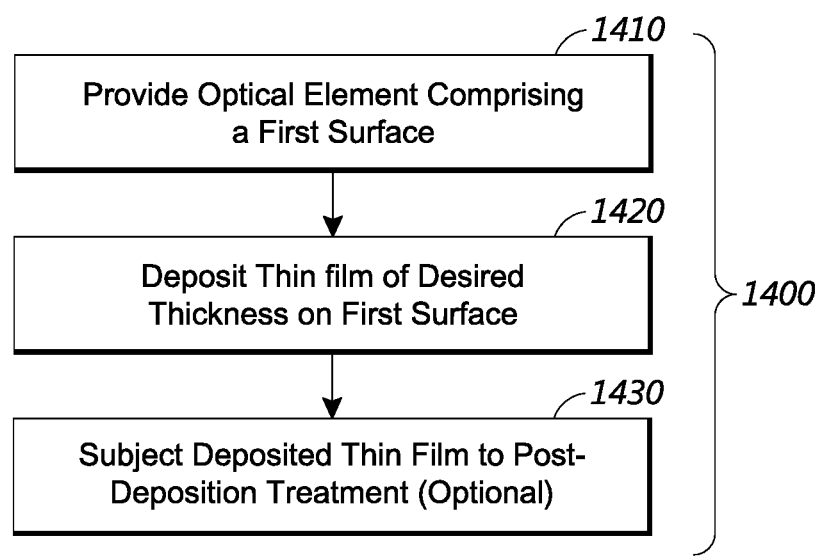
FIG. 11 is a flow diagram for a process for forming a light absorber on a surface of an optical element according to some embodiments.

Referring to FIG. 11 and according to some embodiments, a process 1400 for forming the light absorber on a surface of a waveguide may comprise:
- at block 1410, providing at least one waveguide in a reaction chamber, the at least one waveguide comprising at least a first surface;
- at block 1420, depositing a thin film of a desired thickness directly on the first surface of the at least one waveguide via a deposition process in the reaction chamber; and
- optionally, at block 1430, subjecting the deposited thin film to a post deposition treatment process.

It will be appreciated that the deposited thin film forms the light absorber. The waveguide may be an individual waveguide or may be part of a waveguide stack, as described herein.

In some embodiments, at least the first surface of the waveguide may be subjected to a pretreatment process prior to the block 1410. In some embodiments, the pretreatment process may comprise cleaning at least the first surface of the waveguide.

Referring again to FIG. 11, in some embodiments, at least one waveguide is provided in a reaction chamber at block 1410 and the process 1400 is at least partially carried out within the reaction chamber. The reaction chamber may be a reaction chamber configured for vapor deposition as described herein.

In some embodiments, the at least one waveguide may be, for example, a waveguide stack as described herein. In some embodiments, the stack includes gas tight spacers, adhesive, or other sealant that join the waveguides of the stack and prevent vapor from flowing into the space between the waveguides. Advantageously, where the deposition is utilized to deposit a light absorbing film on the edges of the waveguides of the stack, the deposition may be simultaneously deposited the film on all or multiple waveguides of stack, while the sealant between the spacers prevents undesired deposition between the waveguides.

In some embodiments, depositing the thin film at block 1420 may comprise a deposition process, such as a vapor deposition process. The deposition process may comprise an atomic layer deposition (ALD) process, a plasma enhanced ALD (PEALD) process, a chemical vapor deposition (CVD) process, a plasma enhanced CVD (PECVD) process, a physical vapor deposition (PVD) process, or other vapor deposition process. In some embodiments, the deposition process may comprise an evaporation process, for example a thermal evaporation process, an electron-beam process, a molecular beam epitaxy (MBE) process, a resistive evaporation process, a flash evaporation process, or other evaporation process.

In some embodiments, during the evaporation process, a source material is evaporated to form a vapor comprising a species of the source material. For example, the source material may be evaporated by directly or indirectly heating the source material, for example in a crucible. In some embodiments, the source material may be evaporated by providing an electrical current through the source material. In some embodiments, the source material may be evaporated in a vacuum or a partial vacuum. In some embodiments, the source material is evaporated in the same chamber as the waveguide. In some other embodiments, the source material may be evaporated in a second, different chamber and then flowed into the reaction chamber accommodating the waveguide. In some embodiments, the source material is a gas phase material stored in a container in gas communication with the reaction chamber.

In some embodiments, the source material may comprise carbon or silicon. For example, the source material may comprise graphite, amorphous carbon, nanocarbons, or other allotropes of carbon. In some embodiments, the source material may comprise a powder. In some embodiments, the silicon source material may comprise a silane, and may be deposited on the substrate by, e.g., CVD or ALD.

Referring again to FIG. 11, at least the first surface of the at least one waveguide is contacted with the vapor comprising a species of the source material for a desired duration. In some embodiments, the duration may be selected based upon the desired thickness of the deposited thin film. In some embodiments, contacting at least the first surface of the at least one waveguide with the vapor comprising a species of the source material may comprise contacting the desired surface in pulses, as discussed herein. In some other embodiments, the waveguide maybe exposed to the vapor continuously during the deposition of the thin film.

In some embodiments, the thin film deposited at block 1420 may have a thickness greater than about 10 nm, greater than about 50 nm, greater than 100 m, or greater than about 500 nm. In some embodiments, the thin film may absorb at least 80% of incident light, at least 90% of incident light, at least 95% of incident light, or at least 96%, 97%, 98%, 99%, or higher of incident light having wavelengths of ranging from 300 to 850 nm (visible range)

In some embodiments, the process 1400 may include an optional post deposition treatment at block 1430. In some embodiments, the optional post deposition treatment may comprise a treatment process configured to increase the optical absorption of the thin film deposited at block 1420. In some embodiments, the optional post deposition treatment may comprise a treatment process configured to increase the durability or hardness of the thin film deposited at block 1420. In some embodiments, an optional post deposition treatment may comprise an annealing process. In some embodiments, an optional post deposition treatment process may comprise an etching process.

In some embodiments, the post deposition treatment may be a process that alters the physical structure of the deposited thin film to increase light absorption properties of the thin film. For example, the deposited thin film may be formed of silicon and the post deposition treatment may modify the surface of the silicon film to convert the film into black silicon, which is highly absorptive of light. Examples of suitable processes for modifying the surface of the silicon film include etching or material removal processes such as reactive ion etching, electrochemical etching, stain etching, metal-assisted chemical etching, and laser treatment. Examples of etch chemistries include of a mixture of copper nitrate, phosphorous acid, hydrogen fluoride, and water. It will be appreciated that the material removal processes may form pillars of silicon material, which in turn forms a highly light absorptive surface.

In the foregoing specification, various specific embodiments have been described. It will, however, be evident that various modifications and changes may be made thereto without departing from the broader spirit and scope of the invention. For example, while advantageously applied to waveguides, it will be appreciated that the light absorbers and methods disclosed herein may be utilized to provide light absorbing structures on any substrate. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Accordingly, the claims are not intended to be limited to the embodiments shown herein, but are to be accorded the widest scope consistent with this disclosure, the principles and the novel features disclosed herein.

What is claimed is:

1. A display device comprising:
  a waveguide stack comprising a plurality of optical waveguides, wherein each optical waveguide comprises:
    a first edge surface and a second edge surface, wherein the first edge surface faces the second edge surface, and
    diffractive incoupling optical elements and diffractive outcoupling optical elements on one or more major surfaces of the waveguide;
  a spatial light modulator comprising an output surface for outputting image light having image content for propagation to the diffractive incoupling optical elements; and
  a first light absorber directly on the first edge surface and a second light absorber directly on the second edge surface, wherein the first and second light absorbers each comprise a vertically aligned nanotube array, wherein nanotubes of the nanotube arrays extend normal to the one of the first edge or second edge on which the nanotubes are disposed.

2. The display device of claim 1, wherein the optical device is a head-mounted augmented reality display system, and wherein the outcoupling optical elements are configured to eject the image light propagating within the waveguide.

3. The display device of claim 1, wherein the film has a thickness of greater than about 100 nm.

4. The display device of claim 1, wherein each optical waveguide further comprises a top major surface and a bottom major surface.

5. A display device comprising:
- a waveguide stack comprising a plurality of optical waveguides, wherein each optical waveguide comprises:
  - first and second major surfaces and edge surfaces extending therebetween, wherein the edge surfaces comprise a first edge surface facing a second edge surface, and
  - diffractive incoupling optical elements and diffractive outcoupling optical elements on one or more major surfaces of the waveguide;
- a spatial light modulator configured to inject image light into each of the optical waveguides;
- a first light absorber film directly contacting the first edge surface, and a second light absorber film directly contacting the second edge surface,
- wherein the first and second light absorber films each consist essentially of a vertically aligned nanotube array, wherein nanotubes of the nanotube arrays extend normal to the one of the first edge or second edge on which the nanotubes are disposed.

6. The display device of claim 5, wherein at least one of the first and second light absorber films absorb at least 90% of incident light having a wavelength ranging from 350 to 850 nm.

* * * * *

UNITED STATES PATENT AND TRADEMARK OFFICE
CERTIFICATE OF CORRECTION

PATENT NO. : 10,852,542 B2
APPLICATION NO. : 15/912877
DATED : December 1, 2020
INVENTOR(S) : Mauro Melli Page 1 of 1

It is certified that error appears in the above-identified patent and that said Letters Patent is hereby corrected as shown below:

In the Specification

In Column 18, Line 42, delete "nano scale" and insert --nanoscale--.

In Column 20, Line 61, delete "(visible range)" and insert --(visible range).--.

In the Claims

In Column 22, Line 62, Claim 2, delete "optical" and insert --display--.

Signed and Sealed this
Twenty-third Day of March, 2021

Drew Hirshfeld
*Performing the Functions and Duties of the
Under Secretary of Commerce for Intellectual Property and
Director of the United States Patent and Trademark Office*